United States Patent
Plumb

(10) Patent No.: US 10,025,551 B2
(45) Date of Patent: Jul. 17, 2018

(54) METHOD AND SYSTEM FOR REAL-TIME AUDIO BROADCAST

(71) Applicant: Disney Enterprises, Inc., Burbank, CA (US)

(72) Inventor: Kevin A. Plumb, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 680 days.

(21) Appl. No.: 13/788,343

(22) Filed: Mar. 7, 2013

(65) Prior Publication Data
US 2014/0258859 A1    Sep. 11, 2014

(51) Int. Cl.
G06F 3/16 (2006.01)
H04R 27/00 (2006.01)
H04R 3/12 (2006.01)

(52) U.S. Cl.
CPC ............. G06F 3/165 (2013.01); H04R 27/00 (2013.01); H04R 3/12 (2013.01)

(58) Field of Classification Search
CPC .............. H04H 20/38; H04N 21/2187; H04N 21/2668; H04N 21/4728; H04R 27/00; H04R 3/12
USPC ........................................................ 455/3.06
See application file for complete search history.

(56) References Cited

U.S. PATENT DOCUMENTS

| | | | | |
|---|---|---|---|---|
| 2007/0014536 A1* | 1/2007 | Hellman | .............. | G11B 27/034 386/259 |
| 2009/0197551 A1* | 8/2009 | Paraskake | .............. | H04B 1/086 455/179.1 |
| 2010/0080163 A1* | 4/2010 | Krishnamoorthi | .... | H04L 12/189 370/312 |
| 2010/0142438 A1* | 6/2010 | Chen | .................. | H04L 12/1895 370/328 |
| 2012/0272117 A1* | 10/2012 | Stadelmeier | .......... | H04L 1/0057 714/752 |
| 2013/0337741 A1* | 12/2013 | Hassan | ................. | H04W 16/14 455/26.1 |

OTHER PUBLICATIONS

Matthew Straeb,"*The Emergency Notification Blog, GSS Alert FM*", http://blog.alertfm.com/post/2010/04/GSS-ALERT-FM.aspx, Printed Mar. 29, 2012, Published Apr. 16, 2010, 3 sheets.
Wikipedia, HD Radio, http://en.wikipedia.org/wiki/HD_Radio, Printed Mar. 29, 2012, 10 sheets.

(Continued)

*Primary Examiner* — Ankur Jain
(74) *Attorney, Agent, or Firm* — Fay Kaplun & Marcin, LLP

(57) ABSTRACT

The exemplary embodiments relate to methods and systems for a real-time localized audio broadcast to attendants at live entertainment events. One embodiment relates to a method comprising receiving location data indicating a location of a device, determining a frequency based on the location data, wherein the frequency is assigned based on a venue location and an audio channel is broadcast on the frequency at the venue location, displaying a software button on a user interface of the device, wherein the software button corresponds corresponding to the audio channel, receiving a user selection of the software button via the user interface, and tuning a RF tuner contained within the device to the frequency to receive the audio channel.

17 Claims, 6 Drawing Sheets

(56) References Cited

OTHER PUBLICATIONS

Live Sports Radio Website, "LiveSportsRadio, Listen Live", http://www.livesportsradio.com/products/, Printed Mar. 29, 2012, 2 sheets.
Live Sports Radio Website, "LiveSportsRadio, Listen Live", http://www.livesportsradio.com/faq/, Printed Mar. 29, 2012, 4 sheets.

* cited by examiner

Method 300

Graphical User Interface
400

METHOD AND SYSTEM FOR REAL-TIME AUDIO BROADCAST

BACKGROUND

Attendants of some sporting events may want to enjoy audio commentary and entertainment related to the events unfolding in front of them. For an event that is being broadcast, fans have used simple radios to receive over the air terrestrial broadcast from local stations while attending the event at a venue. However, due to existing terrestrial technology, such as profanity delays, HD radio and other encoding systems, the broadcast is delayed. Specifically, the broadcast delay could be as long as ninety seconds. Therefore, this makes the idea of listening to the radio at the venue for real time entertainment an obsolete solution.

Furthermore, the idea of listening to audio streaming or webcast via a personal media device in a spectator's seat real time is also not practical due to both provider and various technology, transmission, hardware, software and computation time latencies. Possible ideas to mitigate this digital latency may be to use a local venue media encoder connected to Wireless Data Network at the venue. However, this solution is cost prohibitive based on limited scalability factors. Listening to an announcer (e.g., play-by-play commentary) as much as two hundred and forty seconds after the play you saw live is not compelling. More specifically, any delay between watching a live event and listening to an audio broadcast of that event would eliminate any added benefit to the overall fan experience at the venue.

DETAILED DESCRIPTION

Figure 1:
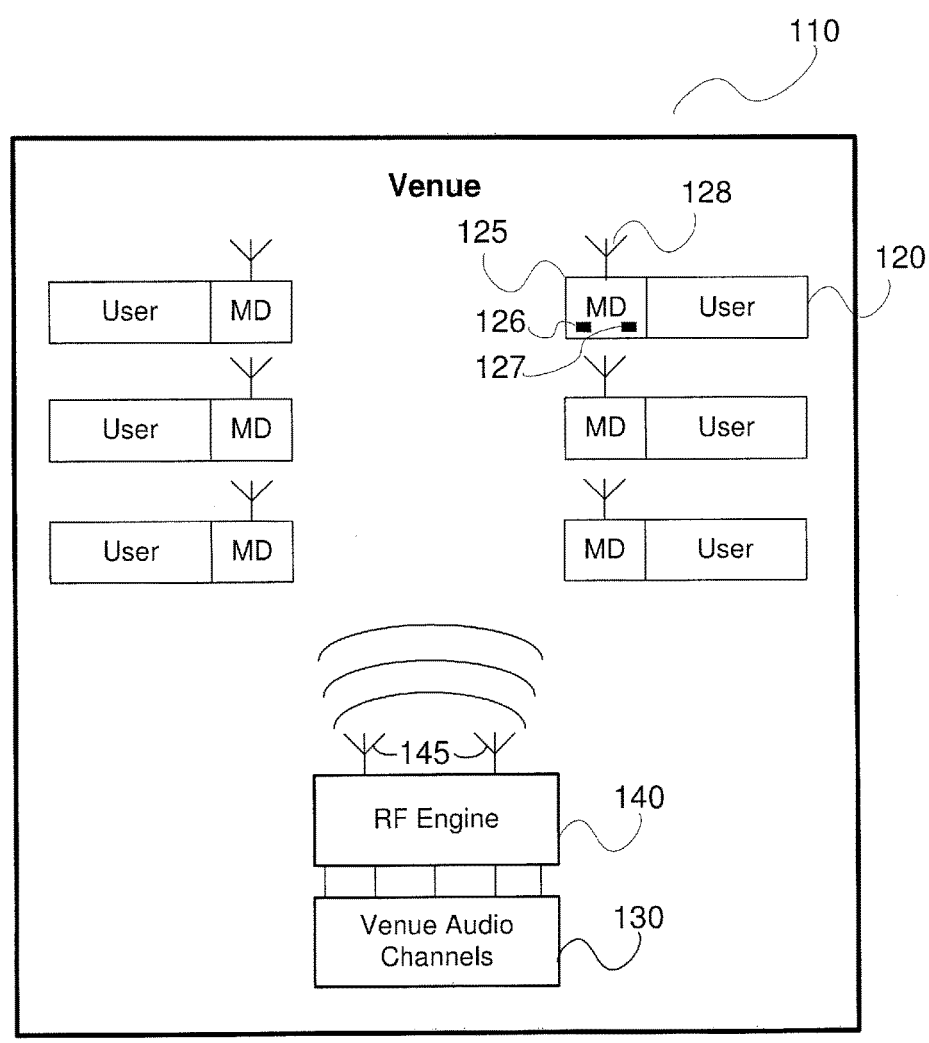
FIG. 1 illustrates an exemplary system utilizing a localized audio broadcast service according to an exemplary embodiment described herein.

The exemplary embodiments relate to methods and systems for a real-time localized audio broadcast to attendants at live entertainment events. One embodiment relates to a method comprising receiving location data indicating a location of a mobile media device, determining a frequency based on the location data, wherein the frequency is assigned based on a venue location and an audio channel is broadcast on the frequency at the venue location, displaying a software button on a user interface of the mobile device, wherein the software button corresponds to the audio channel, receiving a user selection of the software button via the user interface, and tuning a tuner of the media device to the frequency to receive the audio channel.

A further embodiment relates to a system comprising an audio interface to receive audio channel from a plurality of sources, a multiplexer to convert the audio channels into a multiplex channel, an exciter to generate a carrier signal for the multiplex channel within a radio frequency band, wherein each audio channel is assigned a specific frequency based on a venue location and an antenna to broadcast the audio channels across the venue location.

A further embodiment relates to a method comprising receiving audio channels from a plurality of sources, converting the audio channels into a multiplex channel, generating a carrier signal for the multiplex channel within a radio frequency band, wherein each audio channel is assigned a specific frequency based on a venue location, and broadcasting the multiplex channel across the venue location.

The exemplary embodiments may be further understood with reference to the following description of exemplary embodiments and the related appended drawings, wherein like elements are provided with the same reference numerals. Specifically, the exemplary embodiments relate to methods and systems for a real-time localized audio broadcast to attendants at live entertainment events.

In the interest of expanding in-venue fan engagement, it has become clear that a new approach is needed. A new approach should be taken to support the current requests of team or event management, leagues, sponsors, and partners, as well as leveraging assets from content providers (e.g., ESPN Audio, ESPN.com, etc.). As noted above, the digital streaming of a play-by-play audio broadcast is expensive and typically includes complex restrictive terms and conditions based on the listening location of the fan. However, terrestrial broadcast rights are not as complicated and may simply be restricted to the local market, which would include the venue of the event.

According to the exemplary systems and methods described below, a real-time localized audio broadcast service (or "broadcast service") may be delivered to the attendants through one or more channels of terrestrial signals. This real-time in seat/venue audio provided by this broadcast service would provide the attendants with the look, feel and appearance of a cutting edge streaming/media application. One skilled in the art would understand that the systems and methods described herein may be applicable to domestic and international live events at any type of venue (e.g., stadium and arena events, motorsports events, golf and other course events, ski resorts, museums, parks, education, healthcare, entertainment venues, theme parks, theme park events such as fireworks displays, parades, music shows, etc.).

The systems and methods of the broadcast service allows fans at any venue to enjoy the event play-by-play audio broadcasts and associated location audio feeds (e.g., audio corresponding to in-venue large or small scale video displays, secondary audio, alternative language audio, etc.) with no delay on their equipped mobile or tablet device. Accordingly, there would be no need for the user to purchase, rent, carry or operate a special one-time use radio at the venue. Since the systems and methods may utilize a software-based broadcast service application, there is no added manufacturing commitment to the content provider. Furthermore, unlike other digital streaming services, the number of connected clients is unlimited and the scalability beyond the first client unit has zero cost, as opposed to building an in-venue wireless data network or cellular data network that could support over 50,000 fans.

A further added benefit would be that users of the broadcast service may listen to various audio channel(s) in the background while performing other operations on their media device (e.g., texting, emailing, surfing the internet). The exemplary systems and methods may also present content-providers with additional monetization options, such as, but not limited to, in-event advertising, branding, giveaways, interactive user based social media campaigns etc. In addition, the broadcast service may provide the venue with an emergency interrupt feature thereby allowing for immediate emergency announcements to listening fans across each of the audio channels or data messages and or instructions across the broadcast service user interface. For instance, an audio feed provided from the venue may utilize the broadcast service to broadcast an emergency announcement (e.g., weather/safety announcements, evacuation instructions, power outage information, lost child information, etc.).

FIG. 1 illustrates an exemplary system 100 utilizing the broadcast service according to an exemplary embodiment described herein. The exemplary system 100 may be implemented within a venue 110. As noted above, the venue 110 may be any number of buildings or sites hosting a live event, such as, but not limited to, sports arena/stadiums, outdoor courses, tracks, theme parks, etc.

The venue 110 may include a multitude of attendants or fans, such as users 120. According to the exemplary system 100, any number of these users 120 may have a personal media device 125 (e.g., smartphone, tablet computer, etc.). The exemplary mobile devices 125 may be equipped with a processor 126, a non-transitory computer-readable storage medium (e.g., memory 127) and a multipurpose radio receiver module 128, such as a low-power 802.11n receiver with frequency modulation ("FM") receiving capabilities (e.g., the Broadcom BCM4329 receiver). Accordingly, each of the radio modules 128 of the mobile devices 125 may contain an FM radio receiver. One skilled in the art would understand that while the FM radio section of the mobile devices 125 may be dormant, this feature may be activated with specific programming. As will be described in great detail below, the mobile devices 125 may utilize a custom-built broadcast service software application designed to take full advantage of the multipurpose radio receiver module 128.

The exemplary venue 110 may include a number of audio feeds 130 related to the broadcast of the live event at the venue. As will be described in greater detail below, these audio feeds 130 may feature, for instance, home team play-by-play audio for the event. Aside from home team play-by-play audio, there are also possibilities of other compelling content in-venue that include audio from in-stadium displays, away team play-by-play, TV broadcast audio, natural sound, team broadcast, venue information channel(s), direct feed of umpire, coach(s), player(s), entertainer(s), sideline reporter(s), event official(s), language selections (e.g., Non English language versions of one or all of the channel(s), synchronized music for theme park events (e.g., parades, fireworks displays, light shows, etc.), etc.

The exemplary venue 110 may be provided with a customized RF engine 140 to transmit several terrestrial audio signals of the broadcast service to the users 120 in attendance at the venue 110. For instance, the customized RF engine 140 may include a customizable multiplex process that defines multiple audio channels for broadcast. These audio channels may be micro-broadcasts within, above, or below the existing U.S. FM radio band, or, alternatively, may be broadcast within the U.S. spectrum defined as whitespace. It should be noted that the FM band refers to the U.S. FM band, which is generally 87.5 MHz to 108.0 MHz. However, the RF receiver of the media device 125 is capable of receiving and demodulating a wider frequency band than just the U.S. FM band. Thus, the RF engine 140 may transmit in the U.S. FM band (typically in the higher end of the band), below the U.S. FM band or above the U.S. FM band.

Furthermore, the RF engine(s) 140 may include a customized antenna 145 (e.g., a VHF antenna) orientated in such a way to project signals to all users 120 within the venue 110. Variations to the customized antenna 145 may be based on the venue shape, size, type, layout, location, etc. Variations to the antenna 145 may further include the use of phase array antennas, circular antennas, horizontal and vertical antennas, polarized antennas, distributed network antenna, etc. Regardless of the variations of the antenna 145, the signals transmitted by the customized antenna 145 may be received by the radio modules 128 and processed by the mobile devices 125 of each of the users 120. The operation of the RF engine 140 and its components will be described in great detail below.

Figure 2:
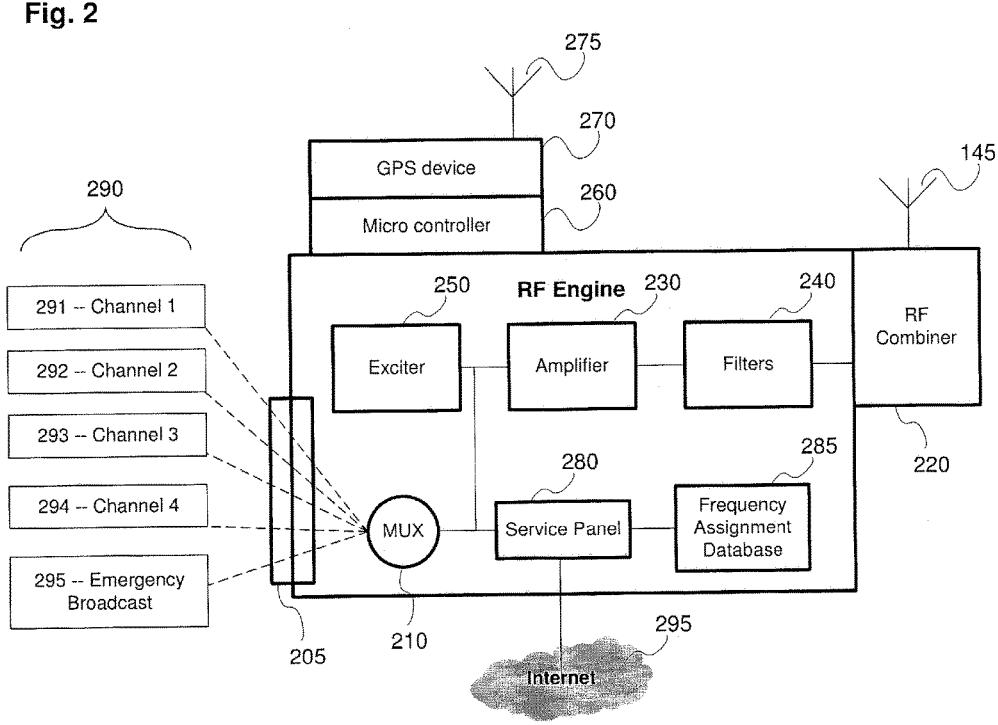
FIG. 2 illustrates an exemplary radio frequency engine for implementing a localized audio broadcast service according to an exemplary embodiment described herein.

FIG. 2 illustrates the exemplary RF engine 140 of FIG. 1 for implementing the broadcast service according to an exemplary embodiment described herein. The RF engine 140 may be a customizable module, designed and built based on a content provider. The RF engine 140 may include an audio interface 205 to receive at least one audio channel from a plurality of sources 290. The RF engine may further include the antenna 145, a multiplexer 210 ("MUX"), an RF combiner 220, RF power amplifier 230, filters 240, an exciter 250, micro controller 260, global positioning system ("GPS") device 270 and service panel 280. Furthermore, the RF engine 140 may include a processor for executing instructions and a memory for storing data, such as data within a frequency assignment database 285. It should be noted that while the frequency assignment database 285 may be stored locally, it is also possible for the RF engine 140 to retrieve and update the frequency assignment database 285 remotely over a network (e.g., the internet 295).

The exemplary RF engine 140 may transmit several terrestrial radio signals from a plurality of audio sources 290. For instance, the audio sources may include, but are not limited to: Channel 1—Home Play-by-Play 291 (e.g., direct audio console out from home team broadcast booth); Channel 2—Away Play-by-Play 292 (e.g., direct audio console out from away team broadcast booth); Channel 3—Alternative Language Audio 293 (e.g., direct audio console out from Non English broadcast booth); Channel 4—in-stadium video display 294 (e.g., direct audio out from venues small or large video display systems); etc. A further channel may include the Audio Control from the venue for Emergency Broadcasts 295. Signals from sources may also contain advertising or signals that trigger to insert advertising or promotional announcements.

Each of the audio sources 290 may be received at the RF engine 140 via the MUX 210. The RF engine 140 may then convert these audio sources 290 (e.g., five sub-carrier channel(s) 291-295) into a multiplex channel(s) within and or below the U.S. FM radio band. One skilled in the art would understand that the FM output is agile and may be set to any channel(s) within and or below the band. A stereo synthesizer may be utilized to produce stereo sound on mono sub-carriers. Other command and data signaling may be used to trigger specific action on users media device.

The exciter 250 of the RF engine 140 may include an electronic oscillator circuit to generate the radio frequency signal and a modulator circuit to add the information to be transmitted to the carrier wave(s) produced by the oscillator.

The RF power amplifier 230 is used to increase the power of the signal, thereby increasing the range of the radio waves from the RF engine 140. Furthermore, the exciter 250 may serve as the injection point for ancillary data services, such as Radio Data System ("RDS"), a communications protocol standard for embedding small amounts of digital information in conventional FM radio broadcasts. RDS standardizes several types of information transmitted, including time, station identification, and program information.

As noted above, the RF engine(s) 140 may be connected to the custom VHF antenna(s) 145. Specifically, the antenna 145 may be connected to the RF engine 140 via the RF combiner 220, the filters 240, the power amplifier 230, and the service panel 280. The exemplary antenna 145 may be a simple circular, horizontal or vertically polarized FM antenna. As noted above, the antenna 145 may utilize phase array antennas or distributed network antenna technologies. For instance, the shape, size and type of venue (e.g., stadium, museum, theater, park, theme park, golf course, ski resort, etc.) may be a factor in determining the antenna type and antenna settings. In addition, the antenna 145 may be arranged in such a way to sufficiently transmit across the venue in accordance with a construction permit, a permanent license, a special temporary authority ("STA") from the Federal Communications Commission ("FCC") and or local spectrum regulator, etc. Part of the setup process for the RF engine 130 in the venue 110 may be measuring the signal strength at various locations in the venue 110 using a field strength meter. The antenna 145 and or the RF engine 140 may be adjusted in the venue 110 based on the in-venue measurements.

The filters 240 may include notch filter, high pass, low pass, band-pass, or other equivalent filters. For instance, a band-pass filter may be used having a low-pass frequency of 60 mHz and a high-pass frequency of 108 mHz. The notch filter may pass most frequencies unaltered, while attenuates those in a specific range to very low levels.

The RF engine 140 may be connected to the GPS device 270 via the micro controller 260. The GPS device 270 may include a GPS antenna 275 for receiving GPS signals to determine a current location (e.g., latitude and longitude information) of the RF engine 140. The RF engine 140 may use the location data from the GPS device 270 when looking up frequency settings within the frequency assignment database 285. Upon determining the location of the venue 110, the RF engine 140 may receive specific frequency values for locally transmitting the multiplex channel(s) within the approved frequency assignments.

The exemplary service panel 280 may serve as the connection point for audio, power, data, GPS communication, and RF out. Furthermore, the RF engine 140 may include additional components such as an audio interface, main power supplies, an uninterruptible power supply ("UPS"), radio data system ("RDS") generator, and an RF exciter.

Figure 3:
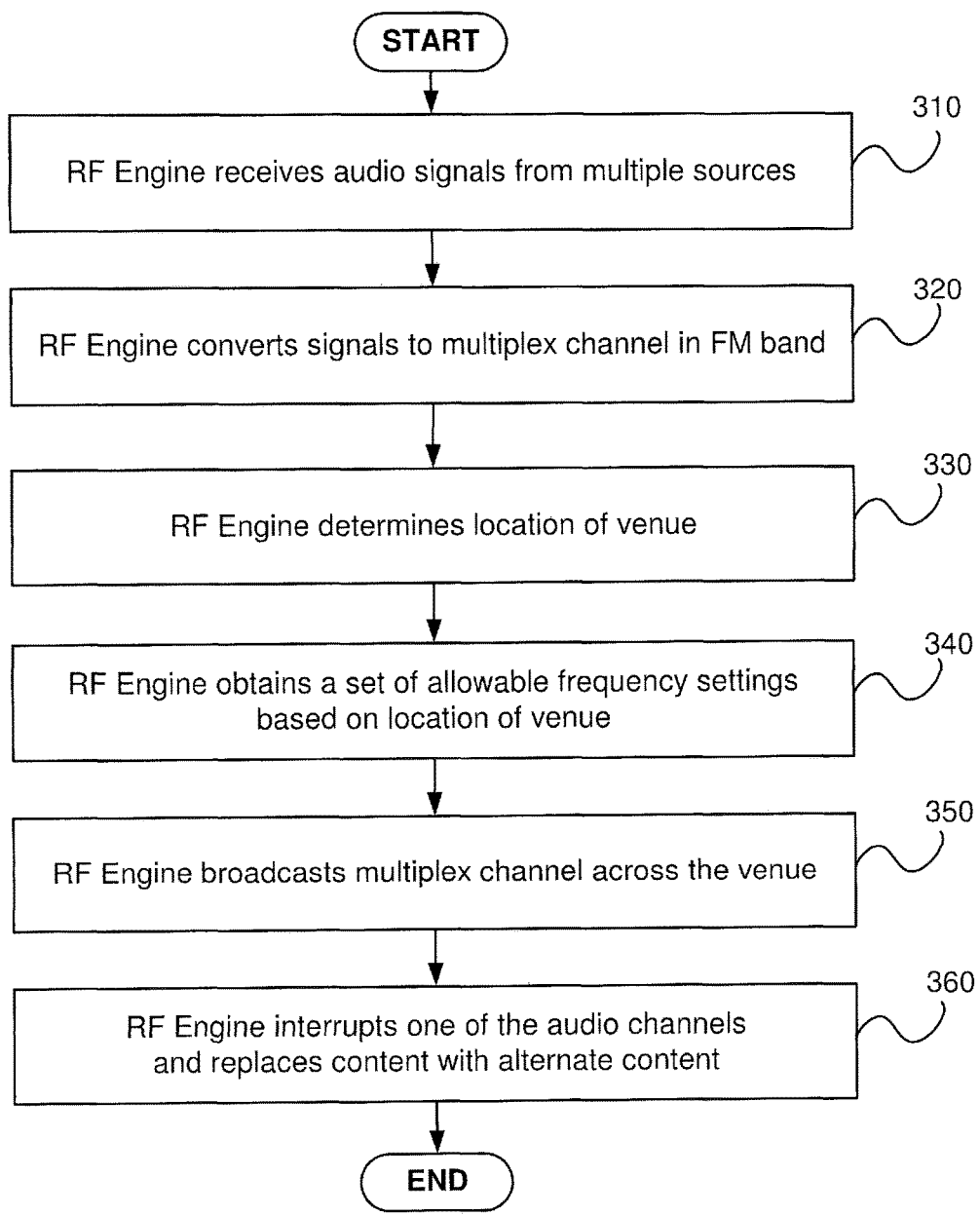
FIG. 3 illustrates an exemplary method for performing a localized audio broadcast service from a radio frequency ("RF") engine according to an exemplary embodiment described herein.

FIG. 3 illustrates an exemplary method 300 for performing the broadcast service from a radio frequency ("RF") engine according to an exemplary embodiment described herein. The exemplary method 300 will be described with reference to the RF engine 140 and the various components of FIGS. 1 and 2.

In step 310, the RF engine 140 may receive audio signals from the multiple sources 290. As noted above, the multiple sources may include audio from in-stadium/venue displays, away or home team play-by-play, TV broadcast audio, natural sound, team broadcast, venue information channel(s), direct feed of umpire, coach(s), player(s), entertainer(s), sideline reporter(s), event official(s), language selections (e.g., Non-English language versions of one or all of the channel(s), synchronized music for theme park events (e.g., parades, fireworks displays, light shows, etc.), etc. Each of these audio signals may be received at the RF engine 140 from the direct audio console out from the various sources 290.

In step 320, the RF engine 140 may convert the audio signals into an RF or equivalent output. As noted above, the MUX 210 may convert each of the sub-carrier or audio signals into a multiplex channel(s) in the FM band or within the approved frequency assignments.

In step 330, the RF engine 140 determines a location of the venue 110 using the GPS device 270 and GPS antenna 275. As noted above, the RF engine 140 may use the location data from the GPS device 270 when determining the local frequency settings for transmitting the multiplex channel(s) within the FM radio band. In step 340, the location data may be used to obtain a set of allowable frequency settings that can be used locally at the venue 110. These frequency settings, along with the GPS data of various locations, may be stored or recalled within the frequency assignment database 285.

Accordingly, a user of the RF engine 140 (e.g., a content provider) has the ability to file for a sub-FM band license in accordance with an STA from the FCC, or other governmental license from a regulatory body. By securing the permit to broadcast on these frequencies locally within the venue 110, the RF engine 140 serves as a small, low cost transmission package.

In step 350, the RF engine 140 broadcasts the multiplex channel(s) across the venue 110 via the antenna 145. Specifically, the multiplex channel(s) may be fed to the RF power amplifier 230 (e.g., a linear RF amplifier having a frequency range of 70-108 mHz, but not limited to), through the filters 240 (e.g., band-pass filters, notch filters, etc.) to the RF combiner 220. The antenna 145 may be attached to the RF combiner 220 and transmit the multiplex channel(s) to venue 110. The broadcast of the multiplex channel(s) may be performed in accordance with the frequency settings specific to the location of the venue 110. For instance, the audio channel(s) may be micro-broadcasts within, above, or below the existing U.S. FM radio band, or alternatively, may be broadcast within the U.S. spectrum defined as whitespace. In addition, the audio channel(s) may be broadcast at a power level that is below a predetermined threshold, wherein the predetermined threshold is set by a regulatory body, such as the FCC or other equivalent regulatory agency. Accordingly, the threshold(s) frequency may vary from region to region and from country to country.

In step 360, the RF engine 130 may interrupt any or all of the audio channel(s) 290 and replace the content from the interrupted audio channel(s) with alternate content. The alternative content may include an emergency broadcast or notification, a station identification message, a content-provider announcement (e.g., "You're listening to ESPN."). Accordingly, upon interrupting one or more audio channel(s) 2920, the RF engine 130 may then broadcast this alternate content on the frequency corresponding to the interrupted audio channel(s) across the venue 110. Or redirect media device to an existing broadcast media stream on the internet.

In an optional step, the RF engine 130 may encrypt the broadcast of the multiplex channel(s). For instances, the RF engine 130 may utilize encryption technologies through encoders and decoders, such as encoder 215 of the RF engine 130. Furthermore, a decoder may be included within the broadcast service software operating a user's media device 125. Accordingly, the encoder 215 may scramble the broadcast signal and the decoder on the media device 125 may decrypt the scrambled broadcast. The encryption process may also include a restricted broadcast that would require media device 125 to retrieve a key via the internet from a location outside the venue/location to enable unrestricted reception of broadcasts from RF engine 125.

Figure 4:
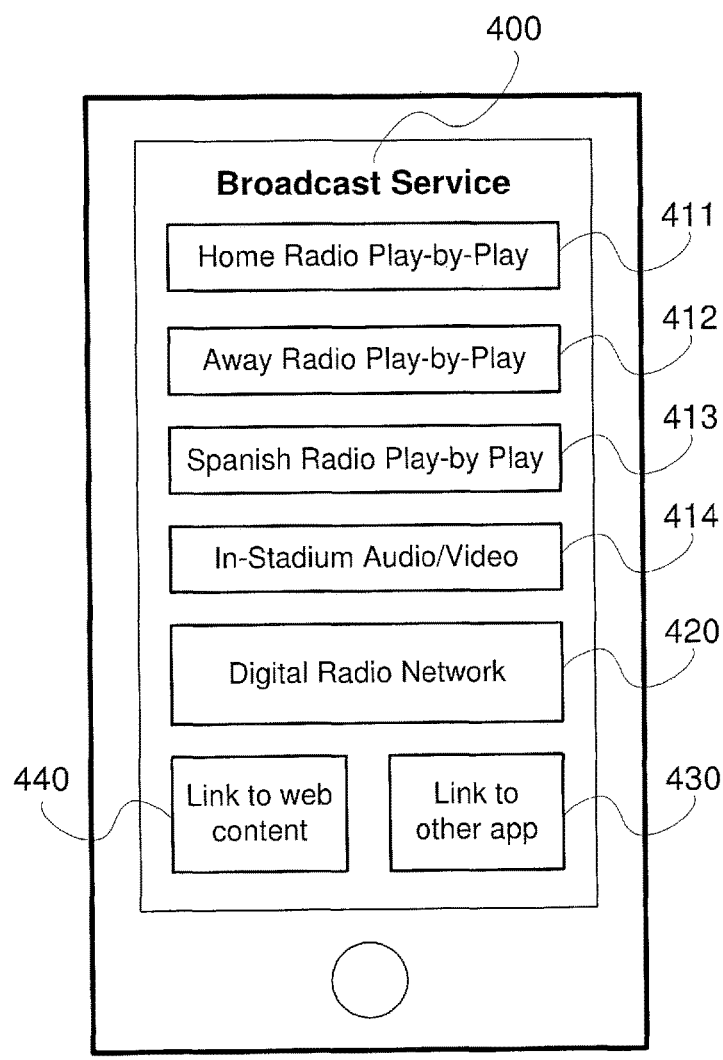
FIG. 4 illustrates an exemplary graphical user interface on a device running the localized audio broadcast service according to an exemplary embodiment described herein.

FIG. 4 illustrates an exemplary graphical user interface ("GUI") 400 on a media device 125 running the broadcast service according to an exemplary embodiment described herein. As noted above, an application on the media device 125 may control the FM radio in the device 125 and work in tandem with the in-venue RF engine 140. The broadcast service may create a new listening experience for fans, spectators and partners during a live event. Furthermore, the operation of the GUI 400 on the media device 125 allows the user 120 to interact with the device's FM tuner. Accordingly, the user 120 may be unaware that the media device 125 is actually tuning a receiver, as the presentation would have the look and feel of accessing a digital/media streaming product/media device. Thus, while the GUI 400 may appear to the user 120 as providing streaming digital audio, the user will, in fact, receive an over-the-air broadcast. Due to the appearance of streaming digital audio to the user 120, the GUI 400 may optionally display a message(s) to the user that the audio provided by the broadcast service will not impact the data usage for the user's media device 125. While certain software functionalities provided by the service may demand minimal data usage, the GUI 400 may notify the user 120 that the received audio signal is a broadcast transmission separate from any wi-fi, wireless data or cellular network.

The exemplary GUI 400 may include a plurality of soft buttons 411-414 designated to specific channel(s) broadcast by the RF engine 140. For instance, the soft buttons may include a Home Radio Play-by-Play button 411, an Away Radio Play-by-Play button 412, a Non English Radio Play-by-Play button 413, an In-Stadium large or small video display audio button 414, etc.

In addition, the GUI 400 may include buttons to other services offered by a content provider. The other services may include a link 420 to digital streaming audio and/or video (e.g., ESPN Radio Network, WatchESPN), a hyperlink 430 to an internet address (ESPN.com), a hyperlink 440 to an integrated application (ESPN Score Center application), etc. Accordingly, aside from the broadcast service controlling the RF receiver of the device 125, the broadcast service may also access, display, and interact with other content offered by a broadcaster, the venue, advertisers, sports teams, etc. Additional button activated services will allow user to opt in or out of features specific to the event they are attending (e.g., flag events based on time of game/event to allow highlight clips to delivered to user or users social media network) Furthermore, the broadcast service may also allow the device 125 to continue to receive email, texts, and calls while in a "broadcast service mode."

Figure 5:
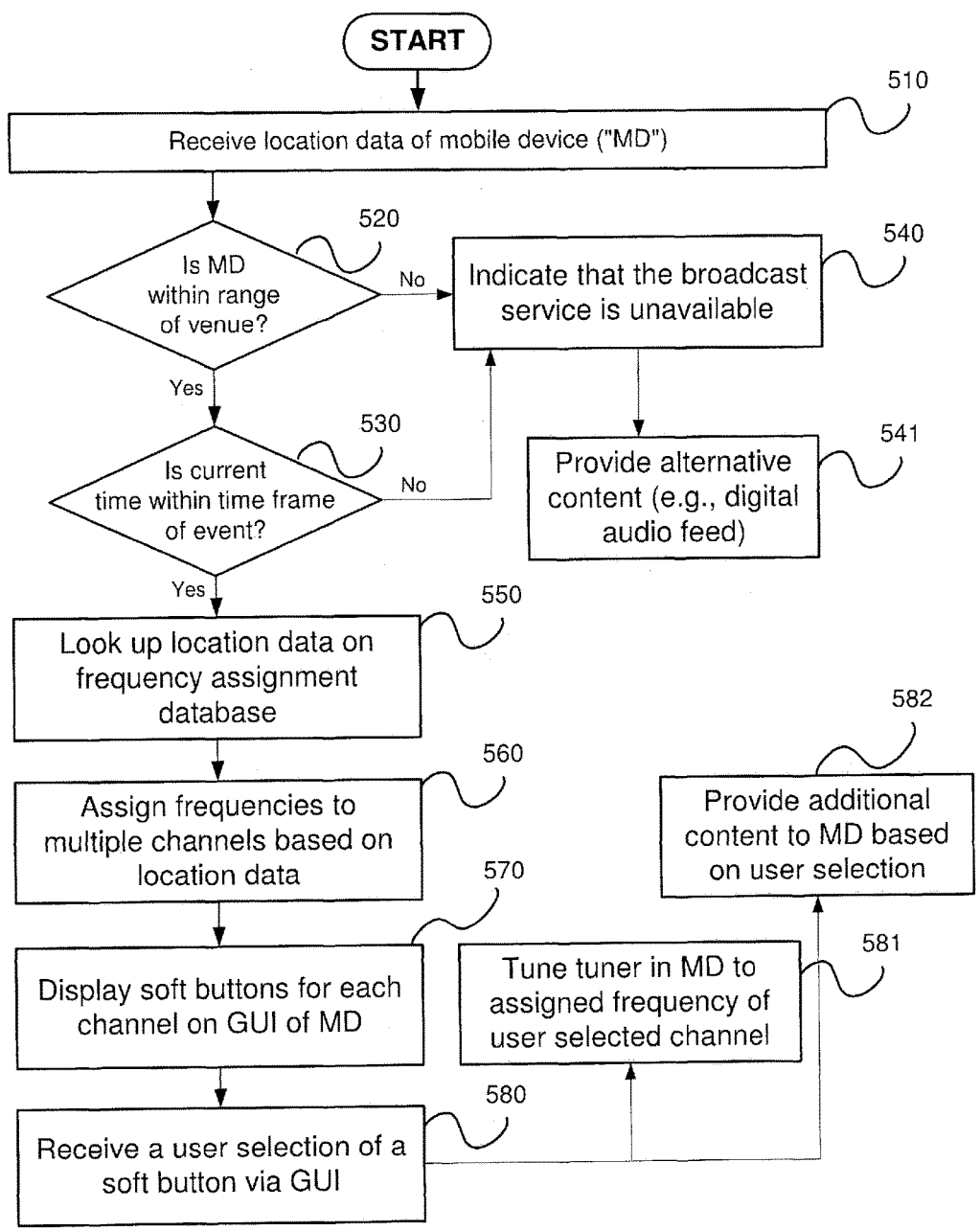
FIG. 5 illustrates an exemplary method for performing the localized audio broadcast service from a user device according to an exemplary embodiment described herein.

FIG. 5 illustrates an exemplary method 500 for performing the broadcast service from the user media device 125 according to an exemplary embodiment described herein. The exemplary method 500 will be described with reference to the media device 125 and the various components of FIGS. 1 and 2. As noted above, the broadcast service allows the media device 125 to operate a custom software-based RF control application via the exemplary GUI 400 illustrated in FIG. 4.

In step 510, the application may receive location data of a media device 125. Specifically, the media device 125 may obtain location data from a GPS receiver within the device 125. The location data may include the latitude and longitude information related to the location of the device 125.

While the exemplary method 500 may allow for the application to obtain location data via a GPS system, alternative embodiments of the methods described herein allow for the location data of the media device 125 and/or venue 110 to be obtained through a variety of techniques. For instance, the location data may be obtained using automatic identification and data capturing ("AIDC") techniques, such as an optical machine-readable representation of data (e.g., barcodes, data matrix codes, quick response codes, stacked barcodes, etc.). According to one example, a data matrix code may be printed onto a venue ticket or surface for a specific event. This data matrix code may provide the application with data pertaining to the time, data and location of the event and venue 110. Furthermore, the data matrix code may provide further detailed data, such as the seating location (e.g., section, row, seat number, etc.) within the venue 110 for the specific ticket. The use of AIDC techniques will be described in greater detail below.

In step 520, the application may determine a proximity to a venue based on the location data of the media device 125. Specifically, the application may determine whether the broadcast service is available within a predetermined range (e.g., 1 mile) from the location of the media device 125. The application may provide the user with an indication of the availability of the broadcast service to the media device 125 based on the proximity to the venue. If it is determined that the device 125 is within the predetermined range, the application may advance to step 530. However, if it is determined that the device 125 is outside of the range, the application may advance to step 540.

In step 530, the application may determine if the current time of the user request is within a time frame for an event. Specifically, the application may determine whether the broadcast service is available for an event within a predetermined time frame (e.g., 4 hours) from the time of the user request. The application may provide the user with an indication of the availability of service to the media device 125 based on the time frame of the event. If it is determined that the user request is within the predetermined time frame for a local event, the application may advance to step 550. However, if it is determined that there is no event scheduled within the time frame of the user request, the application may advance to step 540.

In step 540, the application may indicate that a service is unavailable upon determining that either the proximity to the venue 110 is outside of a designated range of the broadcast service or the current time of the user request is outside of a designated time frame of an event. In step 541, the broadcast service may automatically provide the user with alternative content, such as a streaming digital audio signal (e.g., National ESPN Radio feed). In addition, the application may simply display soft button links to further content (e.g., web-based content, other applications, etc.) via the GUI 400 of the device and await a further user request for the broadcast service. In addition, the GUI may provide the media device 125 tuner instructions and user buttons which allow user choices to listen to the local FM broadcast of the nearest ESPN Station or other FM station(s) signal(s) over the air signal participating with the broadcast service.

In step 550, the application may look up location data on a frequency assignment database of venues. The frequency assignment database may include a listing of various venues and their related frequency settings. Similar to the RF engine 140, the application may store the frequency assignment database within a memory of the media device 125. While the frequency assignment database may be stored locally, it is also possible for the application to retrieve and update the frequency assignment database remote over a network (e.g., the internet).

In step 560, the application may assign frequencies to multiple channel(s) from the frequency assignment database and assign each of the channel(s) to a corresponding software button on the mobile device.

As noted above, a content provider may secure licenses from the FCC, or other equivalent regulatory agency under the common accepted practice of the STA process or other equivalent use approval process. These licenses would cover the venue of interest (e.g., venue 110) and specify effective radiated power, modulation scheme and operating frequency(s) that would be compatible with the RF receiver and demodulator hardware and or software contained in the media device 125.

In step 570, the application may display each of the software buttons over a user interface 400 on the mobile device. Specifically, the custom software based RF control application may utilize the current GPS position of the media device 125 and or user provided location based on selections, frequency settings information from the database, and preset channel(s) soft buttons on the GUI 400 with the correct frequency assignment.

In step 580, the application may receive a user selection of a software button via the GUI 400. As noted above, the exemplary soft button may provide the user 120 with audio content from home radio play-by-play, away radio play-by-play, an alternative language option, in-stadium audio, etc.

In step 581, the application may tune a tuner to an assigned frequency of the selected software button and receive radio signals associated with the assigned frequency from the RF engine 140.

In step 582, the application may receive a user request for additional content. For instance the GUI 400 may display additional soft button to provide the user 120 with links to web-content, digital streaming audio or video, interaction with other applications on the media device 125, etc. Accordingly, upon receiving a user request for such additional content, the application may receive and display the web-based content, the digital audio/video, the application, etc.

According to the exemplary embodiments described herein, the user 120 may install the broadcast service application on the media device 125 through any number of techniques. For instance, the user 120 may download the application from an app store of a service provider, download and transfer the application from a personal computer, download the application from a small plug-in device (e.g., "dongle") attached to the media device 125, etc. Furthermore, the broadcast service application may be preinstalled onto the media device 125.

Therefore, the exemplary embodiments described above may enable viewers or spectators of sporting events to better understand and visualize the progress of rapidly moving athletes. The exemplary embodiments create a custom software based RF control application designed to take advantage of mobile devices and tablets that contain an RF receiver/demodulator capable of receiving signals from the exemplary RF engine 140. The application will provide the fan real-time audio broadcast from multiple sources of content aligned with an event at the venue 110. By using a combination of custom mirco-broadcasting techniques paired with custom software-based application, the broadcast service may automatically tune the tuner of the user's media device to the selected frequency of the on-site RF engine 140.

In addition to the embodiments described above, the broadcast service may include linkage to other technology beyond the FM band. For instance, proximity radio transmission, such as Bluetooth based broadcasting, may be utilized to transmit the signal to the media device 125. While the same concept may apply, the media device 125 may include a Bluetooth decoder and the Bluetooth standards may offer alternatives to user discovery.

Figure 6:
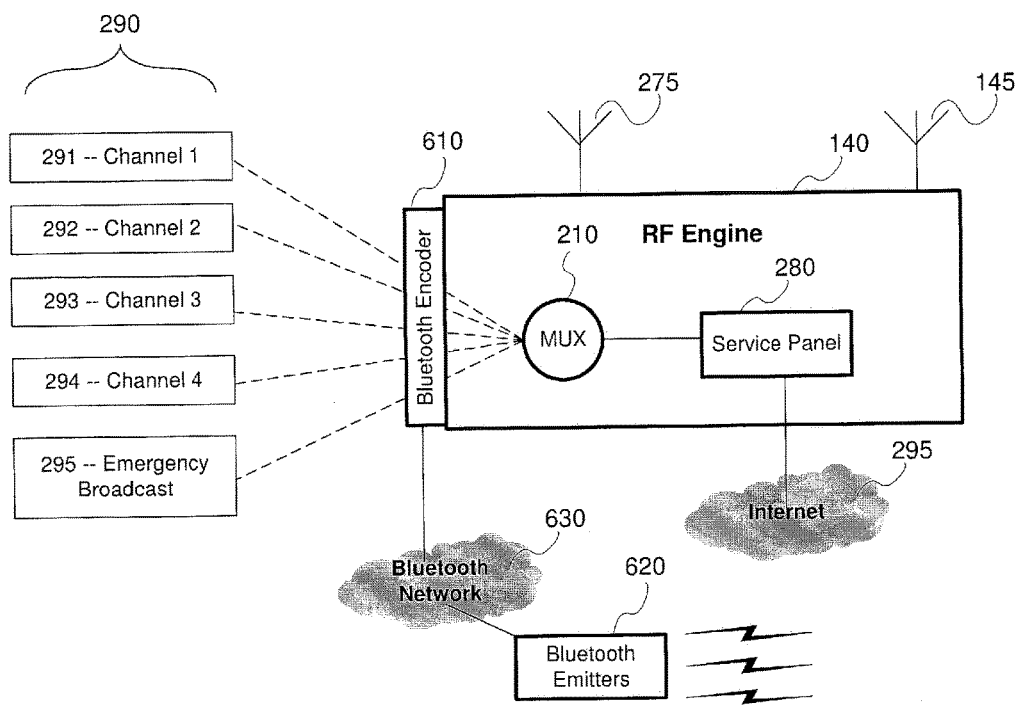
FIG. 6 illustrates an exemplary RF engine implementing Bluetooth broadcast for the broadcast service.

FIG. 6 illustrates the exemplary RF engine 140 implementing Bluetooth broadcast for the broadcast service. For instance, the RF engine 140 may further include a Bluetooth encoder 610 in communication with one or more Bluetooth emitters 620 over a Bluetooth network. The Bluetooth emitters may decode and relay the broadcast from the Bluetooth encoder 610 to any number of Bluetooth-enabled devices, such as media device 125.

According to this embodiment, an exemplary method may include a beacon mode, a handshake request, and content transmission. In beacon mode, the broadcast service may scan for Bluetooth-enabled device (e.g., media device 125) located in a specified range (e.g., venue 110). During the handshake request step, the broadcast service may send a request for permission of sending files to the user 120 of the media device 125. Once the user 120 grants handshake permission, the broadcast service may stream/broadcast real-time audio and associated data at same time while allowing the user 120 to send data back to the broadcast service.

As noted above, the exemplary systems and methods described herein may utilize automatic identification and data capturing ("AIDC") techniques, such as data matrix codes (e.g., QR codes), to obtain location data of the venue 110, the media device 125 and the user 120. For instance, by using a camera (or other data capture arrangement) on the user's media device 125, the user 120 may take a picture of a data matrix code that is printed on the ticket or a program provided to attendees or part of a seat or sign/display of the venue 110. Using the data provided by the code, the broadcast service application may allow the user to download relevant venue information (e.g., broadcast frequencies, data rate, sub-carrier data, geo-location data, class of user, specific demographic information for commercial delivery, link to application store, etc.). This data may then be used to configure the broadcast service application for a specific location, such as the venue 110, a specific section of the venue 110 (e.g., a home or away side, a section, a row, a seat, etc).

According to this exemplary method, the broadcast service application may be activated from the media device 125 through any number of techniques. For instance, in one scenario, the user 120 may already have a pre-installed program including a broadcast service configured application programming interface ("API") on the media device 125. The user 120 may select the broadcast service application from a menu of the program and then be prompted to either capture a corresponding data code or, alternatively, download the broadcast service application from application store. By selecting the data code option, the application may activate the camera function of the media device 125, displaying a targeting box for the data code. The user 120 may then point camera at the data code and align the code with the targeting box. By pressing an action button on the device 125, the data matrix may be captured and decoded. The data obtained from the data matrix code may allow for the broadcast service application to be automatically downloaded onto the media device 125. In addition, the data matrix may preload the application with venue configuration data (e.g., location data, frequency data, etc.) for the embedded tuner of the media device 125.

In a second scenario, the user 120 may already have the broadcast service application installed on media device 125. Upon starting the broadcast service application or module, the user 120 may be prompted with a question asking whether a data matrix code is present (on the ticket, at the venue 110, on the seat, etc.) By selecting "yes" the camera function of the media device 125 may be activated. As described above, the user may then point the camera at the data matrix code to allow for the broadcast service application to automatically download venue configuration data (e.g., location data, frequency data, etc.) for the embedded tuner of the media device 125.

In a further scenario, the user may not have either the broadcast service application or a preinstalled program having the broadcast service API. However, the media device 125 may have the ability to read and process data matrix codes, or the like. Under this scenario, the user may capture and process the data matrix code that is present. The media device 125 may then be directed to specific location (e.g., within an application store or via the internet) to download the broadcast service application. Furthermore, the data from the data matrix may allow for the broadcast service application to automatically download venue configuration data (e.g., location data, frequency data, etc.) for the embedded tuner of the media device 125.

Those of skill in the art will understand that the above-described exemplary embodiments may be implemented in any number of matters, including as a software module, as a combination of hardware and software, etc. For example, the exemplary method 100 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A system, comprising:
   an audio interface to receive audio channels from a plurality of sources;
   a multiplexer to convert the audio channels into a multiplex channel;
   an exciter to generate a carrier signal for the multiplex channel within a radio frequency band;
   a positioning device to determine a venue location in which the system is located;
   a frequency assignment database to receive and store frequency assignment data, wherein a look up is performed on the frequency assignment database based on the venue location and each audio channel is dynamically assigned a specific frequency based on the frequency assignment database; and
   an antenna to broadcast the multiplex channel across the venue location,
      wherein the antenna is a customized antenna oriented to project signals to all users within the venue location, wherein variations to the customized antenna are based on the size, shape and type of venue location,
      wherein variations to the customized antenna further include the use of at least one of a phase array antenna, a polarized antenna, and a distributed network antenna, and
   wherein broadcasting the multiplex channel includes interrupting at least one of the audio channels, replacing content from the at least one interrupted audio channel with alternate content and broadcasting the alternate content on the frequency corresponding to the at least one interrupted audio channel across the venue location.

2. The system of claim 1, further comprising:
   an amplifier to receive the multiplex channel from the exciter and amplify the multiplex channel prior to broadcast by the antenna.

3. The system of claim 2, further comprising:
   a filter to receive the amplified multiplex channel and filter the amplified multiplex channel for selected frequencies.

4. The system of claim 1, further comprising:
   a GPS component to receive location data for the system; and
   a service panel to receive the location data and determine the venue location based on the location data, the service panel further performing the look up on the frequency assignment database.

5. The system of claim 1, wherein the audio channels include at least one of a radio broadcast, a television broadcast, audio from an in-venue display, an alternate language broadcast and an emergency broadcast.

6. The system of claim 1, further comprising:
   a memory to store the frequency assignment database including a set of frequencies assigned to each of a plurality of venues and to update the frequency assignment database based on information received over a network.

7. The system of claim 1, further comprising:
   a short-wavelength radio transmission encoder in communication with at least one short-wavelength radio transmission emitter over a short-wavelength radio transmission network.

8. The system of claim 1, wherein the frequency assignment database includes frequencies that have been granted a governmental license from a regulatory body.

9. The system of claim 1, wherein the broadcast of the multiplex channel is encrypted, wherein enabling unrestricted reception of the broadcast of the multiplex channel requires a receiving device to retrieve a key via the internet from a location outside the venue location.

10. The system of claim 1, wherein the system includes an emergency interrupt feature to allow for immediate emergency announcements to broadcast across each of the audio channels.

11. A method, comprising:
    receiving audio channels from a plurality of sources at a radio frequency engine;
    converting the audio channels into a multiplex channel;
    generating a carrier signal for the multiplex channel within a radio frequency band;
    determining a venue location in which the radio frequency engine is located;
    storing frequency assignment data in a frequency assignment database;
    performing a look up on the frequency assignment database based on the venue location;
    dynamically assigning each audio channel a specific frequency based on the frequency assignment database;

broadcasting the multiplex channel across the venue location, and wherein the multiplex channel is broadcast with an antenna, wherein the antenna is a customized antenna oriented to project signals to all users within the venue location, wherein variations to the customized antenna are based on the size, shape and type of venue location, wherein variations to the customized antenna further include the use of at least one of a phase array antenna, a polarized antenna, and a distributed network antenna;

interrupting at least one of the audio channels;

replacing content from the at least one interrupted audio channel with alternate content; and broadcasting the alternate content on the frequency corresponding to the at least one interrupted audio channel across the venue location.

12. The method of claim 11, further comprising:
receiving location data; and
determining the venue location based on the location data.

13. The method of claim 11, wherein the location data is received from one of an optical machine-readable representation of data and a GPS component.

14. The method of claim 11, wherein the audio channels include at least one of a radio broadcast, a television broadcast, audio from an in-venue display, an alternate language broadcast and an emergency broadcast.

15. The method of claim 11, wherein the frequency assignment database includes frequencies that have been granted a governmental license from a regulatory body.

16. The method of claim 11, wherein the broadcast of the multiplex channel is encrypted, wherein enabling unrestricted reception of the broadcast of the multiplex channel requires a receiving device to retrieve a key via the internet from a location outside the venue location.

17. The method of claim 11, wherein the method includes an emergency interrupt feature to allow for immediate emergency announcements to broadcast across each of the audio channels.

* * * * *